(12) United States Patent
Laux et al.

(10) Patent No.: US 11,284,631 B2
(45) Date of Patent: Mar. 29, 2022

(54) COFFEE CHERRY PROCESSING METHODS

(71) Applicant: MASTERCOLDBREWER AG, St. Gallen (CH)

(72) Inventors: Roland Laux, Roggwil (CH); Tilo Hühn, Schönenberg (CH)

(73) Assignee: MASTERCOLDBREWER AG, Gallen (CH)

( * ) Notice: Subject to any disclaimer, the term of this patent is extended or adjusted under 35 U.S.C. 154(b) by 57 days.

(21) Appl. No.: 16/625,623

(22) PCT Filed: Jun. 22, 2018

(86) PCT No.: PCT/EP2018/066721
§ 371 (c)(1),
(2) Date: Dec. 20, 2019

(87) PCT Pub. No.: WO2018/234528
PCT Pub. Date: Dec. 27, 2018

(65) Prior Publication Data
US 2021/0153520 A1 May 27, 2021

(30) Foreign Application Priority Data
Jun. 22, 2017 (EP) .................................. 17001068

(51) Int. Cl.
*A23F 5/02* (2006.01)
*A23F 5/08* (2006.01)
(Continued)

(52) U.S. Cl.
CPC .................. *A23F 5/26* (2013.01); *A23F 5/02* (2013.01); *A23F 5/08* (2013.01); *A23F 5/48* (2013.01)

(58) Field of Classification Search
CPC ...... A23F 5/26; A23F 5/02; A23F 5/08; A23F 5/48
See application file for complete search history.

(56) References Cited

U.S. PATENT DOCUMENTS 2,149,876 A * 3/1939 Wendt ...................... A23F 5/06
426/417
4,798,732 A * 1/1989 Osawa ...................... A23F 5/40
426/542
(Continued)

FOREIGN PATENT DOCUMENTS

JP         53-9360        1/1978
WO    2004/098303 A1    11/2004
(Continued)

*Primary Examiner* — Anthony J Weier
(74) *Attorney, Agent, or Firm* — Seed IP Law Group LLP

(57) ABSTRACT

Described are methods and/or techniques for the production of coffee fruit extracts on the basis of coffee cherries, which enable improved extraction and yield of usable aromatic constituents and nutritionally beneficial components (incl. polyphenols, antioxidants, and/or sugars) of the coffee fruit. Specifically, the invention relates to a coffee cherry processing method, having the steps of: (1) adding water to coffee cherries or to any of pulp or green, unroasted coffee beans obtained from the coffee cherries to form a suspension; (2) wet grinding said suspension in multiple steps to an average particle size of 100μm or less; and (3) subjecting said suspension to one or more separation and/or processing steps having at least the separation of the water phase to obtain at least one coffee cherry extract selected from coffee cherry aroma, coffee cherry oil, coffee cherry powder, coffee cherry juice, coffee pulp aroma, coffee pulp powder, coffee pulp juice, coffee aroma and green or roasted coffee powder.

14 Claims, 4 Drawing Sheets

(51) Int. Cl.
  *A23F 5/26* (2006.01)
  *A23F 5/48* (2006.01)

(56) References Cited

U.S. PATENT DOCUMENTS

| | | | | |
|---|---|---|---|---|
| 2005/0132893 | A1* | 6/2005 | Arora | B02C 23/12 |
| | | | | 99/287 |
| 2007/0190207 | A1* | 8/2007 | Takahashi | A23F 5/243 |
| | | | | 426/52 |
| 2007/0248731 | A1* | 10/2007 | Curti | A23F 5/46 |
| | | | | 426/533 |
| 2011/0014337 | A1* | 1/2011 | Miljkovic | A23F 5/46 |
| | | | | 426/432 |
| 2012/0027900 | A1* | 2/2012 | Huhn | A23F 5/486 |
| | | | | 426/385 |
| 2013/0177672 | A1* | 7/2013 | Robinson | A23L 2/52 |
| | | | | 426/72 |
| 2016/0015051 | A1* | 1/2016 | Belliveau | A21D 10/005 |
| | | | | 426/542 |
| 2016/0021897 | A1* | 1/2016 | Belliveau | A21D 13/066 |
| | | | | 426/542 |
| 2016/0030350 | A1* | 2/2016 | Muller | A23L 33/105 |
| | | | | 424/777 |
| 2017/0119006 | A1* | 5/2017 | Ragnarsson | A23F 5/243 |
| 2018/0184679 | A1* | 7/2018 | Miljkovic | A23F 5/16 |

FOREIGN PATENT DOCUMENTS

| | | |
|---|---|---|
| WO | 2004/098320 A1 | 11/2004 |
| WO | 2010/073114 A1 | 7/2010 |
| WO | 2013/103465 A1 | 7/2013 |

* cited by examiner

COFFEE CHERRY PROCESSING METHODS

FIELD OF INVENTION

This invention relates to methods and/or techniques for the production of coffee fruit extracts on the basis of coffee cherries, which enable improved extraction and yield of usable aromatic constituents and nutritionally beneficial components (incl. polyphenols, antioxidants, and/or sugars) of the coffee fruit.

In certain embodiments, this invention relates to coffee-based products obtained by making use of said coffee fruit extracts.

BACKGROUND OF THE INVENTION

Coffee is among the world's largest legal agricultural exports and numerous coffee processing methods are known in the art.

A coffee fruit, commonly denoted as a coffee cherry, consists of seeds (i.e. beans) that are surrounded—from inside to outside—by a silver skin, endocarp (i.e. the hull parchment), inner mesocarp (i.e., the mucilage), outer mesocarp (i.e. the pulp) and exocarp (i.e., the outer skin). Typical coffee processing methods involve the isolation of the beans from the cherry, which is followed by drying, roasting and grinding steps, resulting in ground roasted coffee which may be extracted with hot water to provide a coffee beverage. Such methods may also be performed as wet processing methods. Herein, pulp is removed from ripe coffee cherries and the resulting mucilage-coated parchment is fermented in water tanks for approximately 24 to 48 hours, whereupon the loosened mucilage is drained with the water. After the hull-coated green beans have been mechanically dried or sun-dried to a moisture content of about 11 to 12% and the hull has been removed, the green beans are typically either packaged or roasted at temperatures of from 180 to 230° C. and optionally milled. In order to improve the capture rate of coffee by-products, WO 2010/073114 A1 discloses coffee extraction methods, wherein water is added to roasted coffee beans, the resulting suspension is wet ground, and one or more extraction steps are performed on the ground or milled coffee beans with heat and under pressure to obtain coffee powder, coffee liquid, aroma extracts, polyphenols and/or bio-actives.

While the main purpose of fermentation has been commonly viewed as to promote the removal of mucilage, recent studies suggest that fermentation plays a significant role in the development of desirable sensory attributes (see e.g. L. W. Lee et al., Food Chemistry 2015, 185, 182-191). However, obtaining an effective control over the fermentation process poses a serious challenge in view of the inconsistencies of the coffee fruit material and the processing conditions. Also, it is difficult to correctly determine the ideal grade and duration of the fermentation and minor misinterpretations may result in microorganism spoilage (under-fermentation) or unpleasant sour flavors and/or alcoholic taste (over-fermentation).

Coffee aroma formation mainly occurs during roasting following a series of Maillard reactions, caramelization and other thermal reactions based on aroma precursors contained in the green bean. However, prolonged roasting also has the effect that both nutritionally beneficial (e.g. antioxidants, polyphenols) and undesirable components (high concentrations of acids (e.g., chlorogenic acid, acetic acid, citric acid, quinic acid) and bitter constituents) of the coffee bean are simultaneously degraded. Thus, it remains very difficult to identify ideal roasting durations and/or conditions which consistently result in coffee products which at the same time exhibit a non-bitter, non-sour taste, a rich aromatic profile, good digestibility and high contents of polyphenols, antioxidants, vitamins and/or sugars.

In view of the above, it would be desirable to provide a coffee fruit processing method, wherein a wider variation of fermentation and roasting conditions and also a larger range of coffee fruits (e.g. *Robusta* coffee having relatively high chlorogenic acid contents contributing to astringency in the final product) may be employed with satisfying results.

Also, it remains desirable to provide processing methods which make ideal use of coffee cherry components other than the coffee beans in order to commercialize new beneficial (by-)products. For example, unless the coffee pulp is immediately dried in order to provide a basis for coffee cherry tea (also known as cascara), it is traditionally discarded together with parchment and hull residues in view of its relatively high acidity and corrosivity to equipment. However, the by-products of coffee bean processing (incl. coffee pulp, mucilage and hull) also exhibit favorable contents of antioxidants (including caffeine and chlorogenic acid), polyphenols, polysaccharides, and aromatic flavors. In the recent years, particular focus has been therefore laid on the manufacture of food products and nutritional supplements by also making use of said by-products.

A problem commonly observed in the processing of whole coffee cherries is the tendency of the pulp and husk to spoil in the presence of molds, fungi and other microorganisms, which may result in undesirable concentrations of mycotoxins. In this regard, WO 2004/098303 A1 discloses a quick-drying technique for the preparation of coffee cherry beverages, wherein shortly after picking, sub-rip coffee cherries are quick-dried for extended periods in order to control the mycotoxin contamination.

WO 2004/098320 A1 discloses a coffee cherry processing method, wherein preferably pre-dried coffee cherries are ground prior to forming a suspension by adding extraction solvent. WO 2013/103465 A1 discloses a coffee cherry processing method, wherein whole beans or cherries are ground to a particle size of 90 to 1000 µm, soaked in an extraction medium (e.g., water) and then subjected to high pressure extraction at a pressure of at least 2000 bar, in order to obtain coffee fruit extracts.

However, the described methods still leave room for improvement, since they tend to require elaborate equipment or involve high material stress during dry milling and grinding. Moreover, it remains desirable to provide a method, wherein the capture rate of a large variety of coffee fruit extracts is improved without degradation of sensitive, nutritionally beneficial ingredients.

The present invention has been made in view of the above enumerated drawbacks and/or desires for improvements in the art.

SUMMARY OF THE INVENTION

The present invention solves this object with the subject matter of the claims as defined herein. The advantages of the present invention will be further explained in detail in the section below and further advantages will become apparent to the skilled artisan upon consideration of the invention disclosure.

Generally speaking, in one aspect the present invention provides a coffee cherry processing method comprising the steps of: (1) adding water to coffee cherries or to any of pulp or green, unroasted coffee beans obtained from the coffee cherries to form a suspension; (2) wet grinding said suspension in multiple steps to an average particle size of 100 µm or less; and (3) subjecting said suspension to one or more separation and/or processing steps comprising at least the separation of the water phase to obtain at least one coffee cherry extract selected from coffee cherry aroma, coffee cherry oil, coffee cherry powder, coffee cherry juice, coffee pulp aroma, coffee pulp powder, coffee pulp juice, coffee aroma and green or roasted coffee powder. Advantageously, said method allows optimized extraction and yield of desirable coffee fruit components and/or provides a route to a large variety of novel usable extracts and products, while enabling simple removal of undesirable components (e.g. acidic and bitter constituents) present in the coffee cherries through the water phase.

In a specific embodiment, the coffee cherry processing method according to the present invention comprises the steps of: (1) adding water to coffee cherries to form a suspension; (2) wet grinding said suspension in multiple grinding steps to an average particle size of 100 µm or less; and (3) subjecting said suspension to one or more separation and/or processing steps comprising at least the separation of the water phase to obtain at least one coffee cherry extract selected from coffee cherry aroma, coffee cherry oil, coffee cherry powder, coffee cherry juice, and coffee aroma.

In another embodiment, the coffee cherry processing method according to the present invention comprises the steps of: (1) separating coffee cherries into pulp and green coffee beans, and adding water to the pulp to form a suspension; (2) wet grinding said suspension in multiple grinding steps to an average particle size of 100 µm or less; and (3) subjecting said suspension to one or more separation and/or processing steps comprising at least the separation of the water phase to obtain at least one coffee cherry extract selected from coffee pulp aroma, coffee pulp powder, and coffee pulp juice.

In a further embodiment, which may be performed independently or in combination with the aforementioned pulp processing, the coffee cherry processing method according to the present invention comprises the steps of: (1) separating coffee cherries into pulp and green coffee beans, and adding water to the green, unroasted coffee beans to form a suspension; (2) wet grinding said suspension in multiple grinding steps to an average particle size of 100 µm or less; (3) subjecting said suspension to one or more separation and/or processing steps to obtain at least one coffee cherry extract selected from coffee aroma and roasted coffee powder.

A further aspect of the present invention is the provision of a coffee cherry extract obtained by the aforementioned methods.

DETAILED DESCRIPTION OF THE INVENTION

Figure 1:
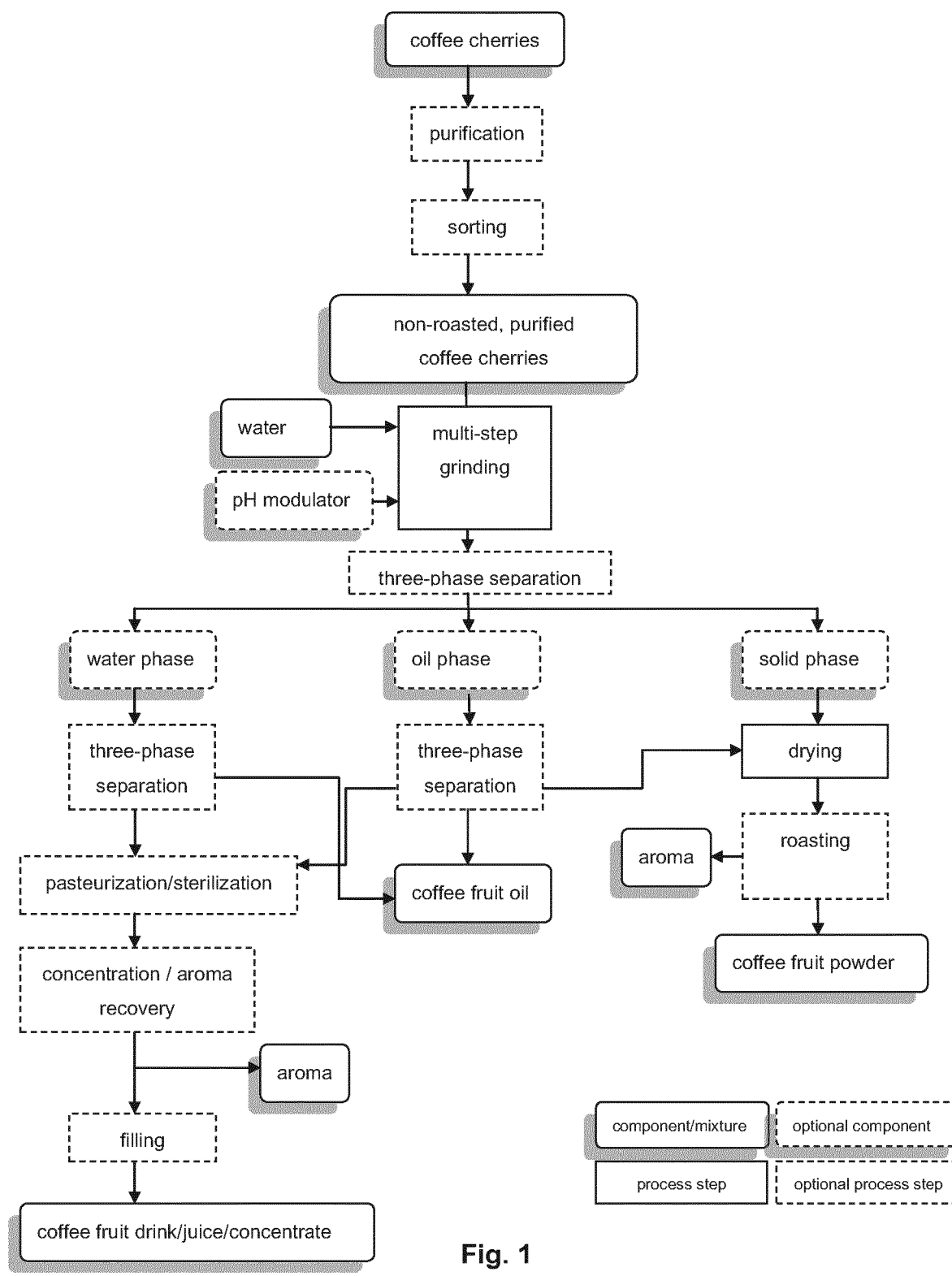
FIG. 1 schematically illustrates the method of processing whole coffee cherries up to the provision of aroma extracts, coffee fruit drinks and concentrates, coffee fruit oils and coffee fruit powder.

For a more complete understanding of the present invention, reference is now made to the following description of the illustrative embodiments thereof:

In a first embodiment, the present invention generally relates to a coffee cherry processing method, comprising the steps of: (1) adding water to coffee cherries or to any of pulp or green, unroasted coffee beans obtained from the coffee cherries to form a suspension; (2) wet grinding said suspension in multiple steps to an average particle size of 100 µm or less; and (3) subjecting said suspension to one or more separation and/or processing steps comprising at least the separation of the water phase to obtain at least one coffee cherry extract selected from coffee cherry aroma, coffee cherry oil, coffee cherry powder, coffee cherry juice, coffee pulp aroma, coffee pulp powder, coffee pulp juice, coffee aroma and green or roasted coffee powder.

Typically, the processing of coffee cherries begins with the harvest of sub-ripe or preferably ripe coffee berries produced by the coffee plant *Coffea* (family Rubiaceae), which may be followed by purification and sorting steps known in the art (including mechanical processing and floating methods). According to the present invention, coffee cherries and green coffee beans subjected to step (1) are in a non-roasted and preferably unfermented state.

In step (1), water is added to form a suspension. While not being particularly limited, the weight ratio of water to coffee cherries, coffee pulp or green coffee beans in the formed suspension is preferably between 1:1 to 6:1, more preferably 2:1 to 4:1, especially preferably about 3:1, which may advantageously affect the processability in the further steps (e.g. facilitated pumping, grinding and/or easier phase separation).

While it may be preferred to use water (e.g. tap water) in step (1), alternative water-containing liquids may also be used as a source of water in order to introduce additional flavors, which may favorably interact with the primary and secondary flavors of the coffee fruit at subsequent stages of the processing methods. Such liquids may include liquids having water contents of from 60 to about 95% by weight, such as fruit juices, fruit juice concentrates, or milk, for example. In case such water-containing liquids are used, it is generally preferable that the water content in the formed suspension falls into the above-defined ratios. In general, it is preferred that the added water or water-containing liquid has a temperature of 40° C. or less, more preferably 30° C. or less.

Forming the aqueous suspension in step (1), i.e. before step (2) has the advantage that solid material is softened prior to grinding and the cooling effect of water further minimizes the mechanical burden on milling equipment. In addition, no drying step is required before wet grinding, which is especially advantageous in view of the relatively low energy expenditure.

In a preferred embodiment, a pH modulation step is performed during or after step (1). Typically, said pH modulation may involve addition of buffer solution or base in order to compensate for overly high acid concentrations in the starting material and/or fine-tune the subsequent extraction profile. Advantageously, added base or buffer may be removed via or neutralized in the water phase in the subsequent processing step (3).

The methods and devices used for wet grinding in step (2) are not particularly limited as long as significant frictional heat production or high mechanical forces are avoided in order to preserve the heat-sensitive components of the coffee fruit. For this purpose, step (2) preferably comprises: (a) one or more coarse grinding step(s) to an average particle size of 500 μm or less, and (b) a subsequent fine grinding step to an average particle size of 100 μm or less, preferably less than 90 μm, even more preferably 80 μm or less. Reducing the particles to the above size ranges range substantially increases the exposed surface area of the particle material for optimized wetting (e.g., with water rather than a chemical solvent) which enables improved extraction results (such as improved extraction of fats or lipids, aromatic substances, and/or polyphenols). The particle size reduction may be accomplished by using disc mills (e.g. perforated disc mill), colloid mills (e.g. toothed colloid mills), or corundum stone mills, for example.

Figure 4A:
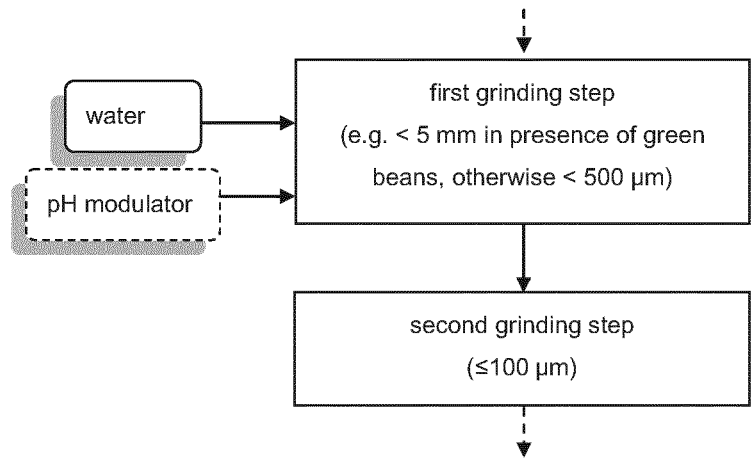
FIG. 4a illustrates an exemplary multi-step grinding method as employed in the present invention.

An exemplary grinding procedure is shown in FIG. 4a. Herein, water is added prior to a first (coarse) grinding step. In case of whole coffee berries or green beans, the first grinding step (which may consist of multiple sub-steps, particularly in case of green beans and while coffee cherries) results in an average particle size of 500 μm or less, which is followed by a second (fine) grinding step to an average particle size of 100 μm or less. The optional pH modulation is preferably carried out before the second (fine) grinding step.

In a preferred embodiment, the method may further comprise a step of subjecting the suspension during or after step (2) to a heat treatment at a temperature of 60° C. or less (e.g. at a temperature of 40 to 60° C.) in order to further enhance the extraction efficiency in the subsequent steps. Alternatively, a pasteurization or sterilization step may be carried out according to methods known in the art to prevent microorganism spoilage/propagation at an early stage.

In another preferred embodiment, the method may further comprise a step of subjecting the suspension during or after step (2) to a maceration step; an incubation step; or a fermentation step.

Maceration enables the solvent to additionally wet the solid material through enlargement of the surface area. Preferably, maceration is performed enzymatically, e.g. by addition of pectinolytic enzymes, which may additionally enhance the extraction of polysaccharides.

Fermentation may be performed by using microbial starter cultures, including indigenous and non-indigenous bacterial and yeast species known in the art, optionally in combination with enzymatic treatment (e.g. by addition of pectinolytic enzymes), while the end point of fermentation may be monitored by chemical measurement of pH, which enables favourable control over the fermentation process when compared to natural, spontaneous fermentation. Advantageously, the method of the present invention also allows to even out sour or alcoholic flavors resulting from over-fermentation by the possibility of removing the same via the water phase.

The incubation step inhibits the germination of coffee beans by physical and/or chemical pre-treatments. For example, it is possible to inhibit germination of coffee beans at an elevated temperature, e.g. at a temperature of between 10 and 70° C., preferably at a temperature of between 10 and 55° C. for a period of between 2 hours and 10 days, preferably between 3 and 168 hours, in an incubation medium. The incubation medium is not specifically limited and may be an aqueous acidic medium or an aqueous ethanol solution, for example. In conventional coffee bean processing methods, using an aqueous acidic medium as incubation medium may be disadvantageous in that substantial amounts of the acid used (usually inorganic or organic acids with preference for amphiphilic acids) remain in the bean, which have to be subsequently removed by thermal treatment or alkalization, or otherwise result in a sour and/or bitter flavor in the final products. Furthermore, spontaneous microbial activities occurring under non-sterile conditions may further contribute to formation of acetic acid. The method of the present invention has the advantage that such acid residues may be effectively dealt with by removing the acid via the water phase in step (3), e.g. by neutralization, distillation, extraction, emulsion-type liquid membrane processes, salting out or combinations thereof, without the necessity to increase the thermal load upon the coffee fruit solids or to treat the coffee fruit solids via alkalization, so that a favorably high amount nutritionally beneficial components may be preserved and a pleasant, non-bitter or non-acidic taste may be achieved. In a preferred embodiment, the incubation medium is an aqueous ethanol solution, wherein the unfermented coffee fruit or green beans are incubated at a temperature of between 10° C. and 70° C., preferably at a temperature of between 10 and 55° for a period of between 2 hours and 10 days, preferably between 3 hours and 96 hours, wherein the volume of the aqueous ethanol solution is sufficient to cover the fruits or beans. Such an incubation step is advantageous in that it represents a simple, reproducible and controllable alternative to microbial (i.e. yeast and bacterial) fermentation, while at the same time a pleasant coffee flavor and taste profile may be achieved. Although not being particularly limited as long as the concentration of ethanol is sufficiently high to prevent spontaneous fermentation by endogenous microbes, the concentration of ethanol in the incubation medium may be from 1 to 90 vol.-%, preferably between 1 and 12 vol.-%. In an especially preferred embodiment from the viewpoint of germination inhibition efficiency and processing costs, the concentration of ethanol in the incubation medium is at least 2 vol.-% and less than 7 vol.-%. The incubation medium may further comprise enzymes known in the art for controlled enzyme-catalyzed reactions in order to facilitate formation of aroma precursors, such as hydrophilic oligopeptides and hydrophobic free amino acids, for example. If applied, the incubation may be carried out in a single step or in multiple incubation steps, wherein different incubation conditions and/or incubation media are employed. As will be known to the skilled artisan, the incubation conditions, such as pH or temperature, may be varied within one single incubation step. The incubation step may further encompass one or more mechanical and/or physical treatment steps commonly known in the art before or during the incubation. Although not being limited thereto, such a mechanical treatment may comprise stirring, mixing and agitating, and combinations thereof, while said physical treatment may comprise an infrared treatment and/or a vacuum treatment, for example.

Figure 4B:
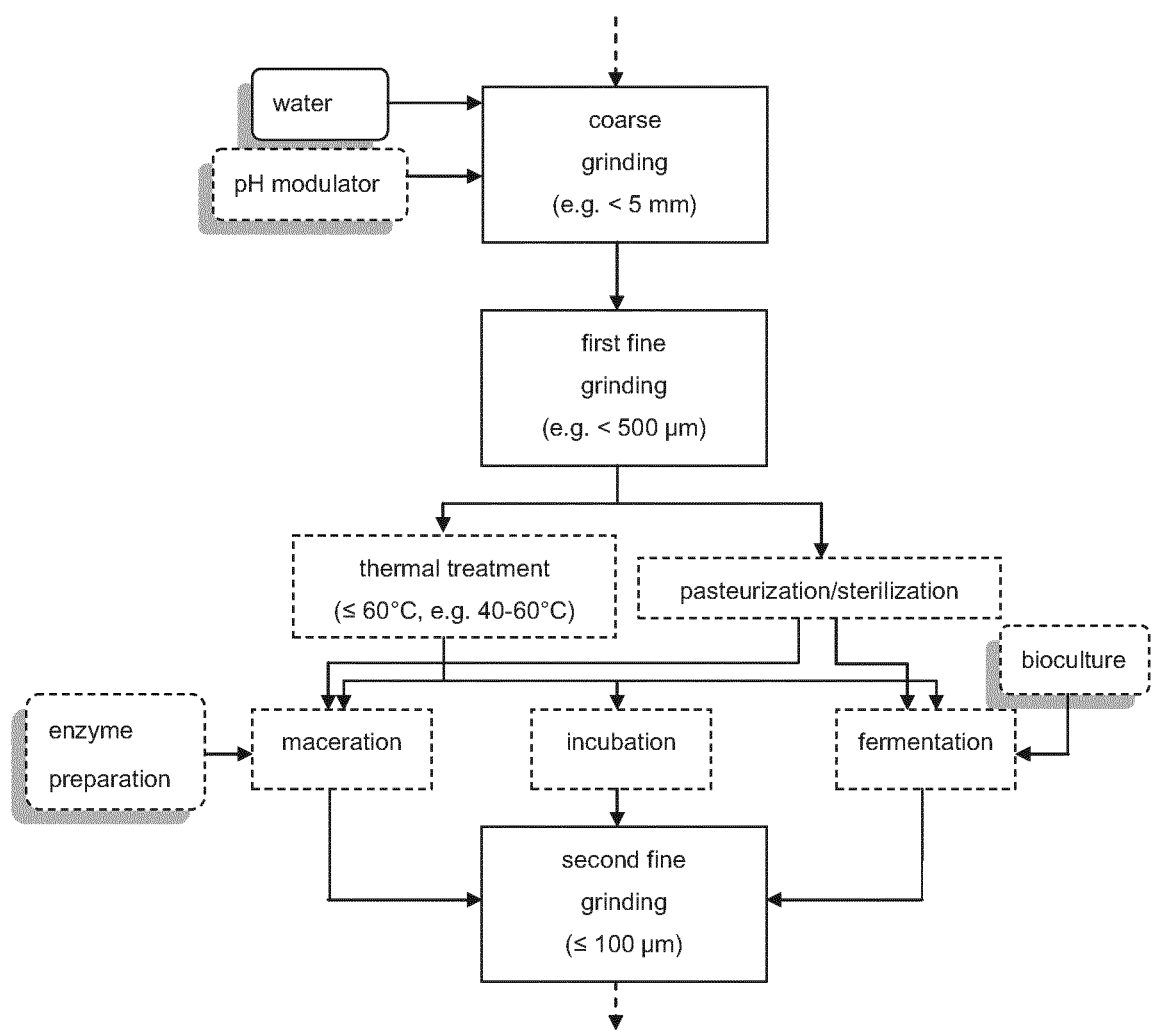
FIG. 4b illustrates an exemplary multi-step grinding method implementing maceration fermentation and/or incubation steps.

One exemplary, preferred implementation of maceration, incubation and/or fermentation steps in the processing of whole coffee berries or green beans is shown in FIG. 4b. Herein, the suspension of coffee berries or coffee green beans is subjected to a coarse grinding step to an average particle diameter of 5 mm or less, preferably less than 5 mm, which is followed by a first fine grinding step to average particles sizes of 500 μm or less, preferably less than 500 μm. Thereafter, the fine ground suspension may be subjected to a thermal treatment at a temperature of 60° C. or less, which may be followed by maceration, incubation or fermentation step. Alternatively, the fine ground suspension may be subjected to pasteurization or sterilization, which may be followed by maceration or fermentation according to the methods explained above. The resulting suspension provides the ideal basis for a second fine grinding step to an average particle size of 100 µm or less, preferably less than 90 µm.

In step (3), the finely ground suspension is subjected to one or more separation and/or processing steps comprising at least the separation of the water phase to obtain at least one coffee cherry extract selected from coffee cherry aroma, coffee cherry oil, coffee cherry powder, coffee cherry juice, coffee pulp aroma, coffee pulp powder, coffee pulp juice, coffee aroma and green or roasted coffee powder.

In a preferred embodiment, the method of the present invention comprises a step of neutralizing acidic components in the water phase and/or removing acidic components from the water phase, the acidic components preferably including chlorogenic acid, acetic acid, malic acid, citric acid and/or phosphoric acid, wherein the step of neutralization and/or removal of acidic components is preferably performed during step (1) or step (3). The method of removing free acids via the water phase is not particularly limited and may be carried out by any suitable method known in the art, including, but not limited to distillation (e.g. extractive distillation or reactive distillation), extraction (e.g. liquid-liquid) extraction, emulsion-type liquid membrane processes, salting out or combinations thereof.

Beside of acids, other undesired water-soluble components, such as astringency-inducing and/or bitter low-molecular polyphenols may likewise be removed from the water phase prior to or during the dearomatisation step, and/or prior to or during the concentration step.

In a further preferred embodiment, step (3) comprises a step of continuously drying the fine ground suspension or solid phase, if present; or wherein step (3) comprises a step of continuously drying and subsequently roasting the fine ground suspension or solid phase, if present.

The specific separation and/or processing steps employed in step (3) may depend on the starting material and will be further described hereinbelow in conjunction with the description of the second to fourth embodiments.

In general, the described method allows optimized extraction and yield of desirable coffee fruit components while enabling simple removal of undesirable components (e.g. acidic and bitter constituents) present in the coffee cherries through the water phase, thus enabling a large variety of coffee fruits (e.g. species usually considered to be of inferior quality) to be used to prepare coffee products with mild, but aromatically rich aroma and high digestibility (e.g. reduced diuretic effects ascribed to overly high acid contents).

Method for Processing Whole Coffee Fruits

In a first embodiment, the present invention relates to a coffee cherry processing method, wherein whole coffee cherries are subjected to the wet grinding step. In other words, a method of the first embodiment comprises the steps of: (1) adding water to coffee cherries to form a suspension; (2) wet grinding said suspension in multiple grinding steps to an average particle size of 100 µm or less; and (3) subjecting said suspension to one or more separation and/or processing steps comprising at least the separation of the water phase to obtain at least one coffee cherry extract selected from coffee cherry aroma, coffee cherry oil, coffee cherry powder, coffee cherry juice, and coffee aroma.

Herein, the pre-processing steps and steps (1) and (2) may be carried out according to the description of the first embodiment and in line with FIGS. 4a and 4b.

A preferred embodiment of performing step (3) starting with whole coffee cherry processing is depicted in FIG. 1. Herein, the finely ground suspension is subjected to: (a) a three-phase separation step, which separates the suspension into a water phase (heavy phase), an oil phase (light phase) and a solid phase, said water phase comprising coffee cherry juice and coffee cherry aroma, said oil phase comprising cocoa fruit oil as major component, and said solid phase comprising green coffee powder and water as major components; and (b) a step of separately processing the three phases, which optionally comprises at least one of: (b1) separating coffee cherry oil from the oil phase, (b2) separating coffee cherry powder and/or aroma from the solid phase, and (b3) separating coffee cherry aroma or coffee cherry juice from at least the water phase.

Preferably, devices employing centrifugal forces may be utilized to achieve mechanical particle separations, such as decanters or nozzle separators, preferably decanters.

Multiple phase separation and recombination steps may be employed to achieve an improved separation between the water phase, the oil phase and the solid phase. For example, the water and oil phases obtained in the three-phase separation may be further purified, e.g. by performing a second three-phase separation step, in order to further improve the recovery and yield of extracts. The solid phase may filtered or centrifuged to separate remaining water, which may be recombined with the water phase from the initial decanting step or at a later processing stage of said phases. Also, the water phase may be subjected to further purification steps, e.g. by filtration using vacuum rotation filters in order to remove fine particles.

After the three-phase separation and the optional purification steps, the water phase, which provides a pathway to a liquid coffee fruit extract which may be filled and served as a drink, juice, or concentrate, may be subjected to an aroma recovery step, wherein hydrophilic aroma components are separated from the water phase. Suitable techniques include, but are not limited to vacuum evaporation, absorption, reverse osmosis techniques or extraction with solvents (e. g. ethanol). In general, the water phase Also, since a large fraction of hydrophilic acidic components present in the pulp, mucilage and bean or added during the pH modulation or incubation will be found in the water phase, these may thus be conveniently neutralized and/or removed by appropriately treating the water phase, if necessary.

In addition, the water phase may be subjected to pasteurization or sterilization prior to or after the concentration/aroma recovery step.

The (wet) solid phase obtained after separation in the three phases may be optionally treated with a heatable roll grinder to reduce particle size and begin pre-drying. The solid phase may be subjected to a drying step and an optional subsequent roasting step to obtain (roasted) coffee fruit powder and aroma. Also, sugar, sugar solution and/or fruit juices may optionally be added to separated coffee solids before drying to improve flavor development during the drying/roasting process.

The method of carrying out the drying/roasting is not particularly limited and may e.g. be accomplished in a drum dryer. In a preferred embodiment, however, the drying/roasting step is carried out in a mixing device comprising a cylindrical, tubular body arranged with its axis horizontal and closed at its opposite ends by end plates, and having a coaxial heating or cooling jacket through which, for example, diathermic oil or another fluid is intended to flow to keep the internal wall of the body at a predetermined temperature. The tubular body has an inlet and outlet openings for the solid phase. The outlet opening communicates, by means of a duct, with a device for separating the aroma phase from the dried product. The device further comprises a bladed rotor is supported for rotation in the tubular body, its blades being arranged as a helix and oriented for centrifuging the solid phase being processed and simultaneously transporting it towards the outlet opening. Using this mixing device advantageously allows the drying/roasting step and the separation of the roasted flavors and other aromatics to be carried out continuously up to the preparation of the coffee fruit powder. During the optional roasting step, which is usually performed for approximately 5 to 15 minutes at temperatures of from 170 to 230° C., the water content of the solid phase is typically reduced from approximately 10-12% to 3% or less. It is to be noted that the applicable roasting duration is less critical when compared to conventional methods, since the solid phase contains only low concentrations of coffee oils, which have been previously separated from the solid phase, thereby minimizing the characteristic smoky and/or burned taste originating from evaporation of coffee oils at prolonged roasting.

Coffee fruit oils may be obtained by purification of the oil phase obtained in the three phase separation. It is understood that said coffee fruit oils are fundamentally different from conventional coffee oils extracted in conventional coffee bean processing methods, since they comprise oily components of the entire coffee fruit and they have not been subjected to roasting.

Method for Processing of Coffee Cherry Pulp

In a third embodiment, the present invention relates to a coffee cherry processing method, comprising the steps of: (1) separating coffee cherries into pulp and green coffee beans, and adding water to the pulp to form a suspension; (2) wet grinding said suspension in multiple grinding steps to an average particle size of 100 μm or less, preferably 50 μm or less; and (3) subjecting said suspension to one or more separation and/or processing steps comprising at least the separation of the water phase to obtain at least one coffee cherry extract selected from coffee pulp aroma, coffee pulp powder, and coffee pulp juice.

Following the purification and sorting of whole coffee cherries, the method according to the third embodiment comprises a step of separation of coffee pulp and green coffee bean. The depulping of the coffee beans may be carried out manually or mechanically. In a preferred embodiment, the coffee pulp is separated from the beans by using a mechanical separation device.

It is to be noted that the expression "coffee pulp" as used in the description of the present invention is understood so as to encompass the mucilage, pulp and exocarp contained in the coffee cherries.

After separation from the beans, water is added to the coffee pulp and the resulting suspension is subjected to multi-step wet grinding in accordance to the procedures described above, with the exception that in the processing of coffee pulp, particle sizes of 500 μm or less are typically already obtained after the first grinding step.

Figure 2:
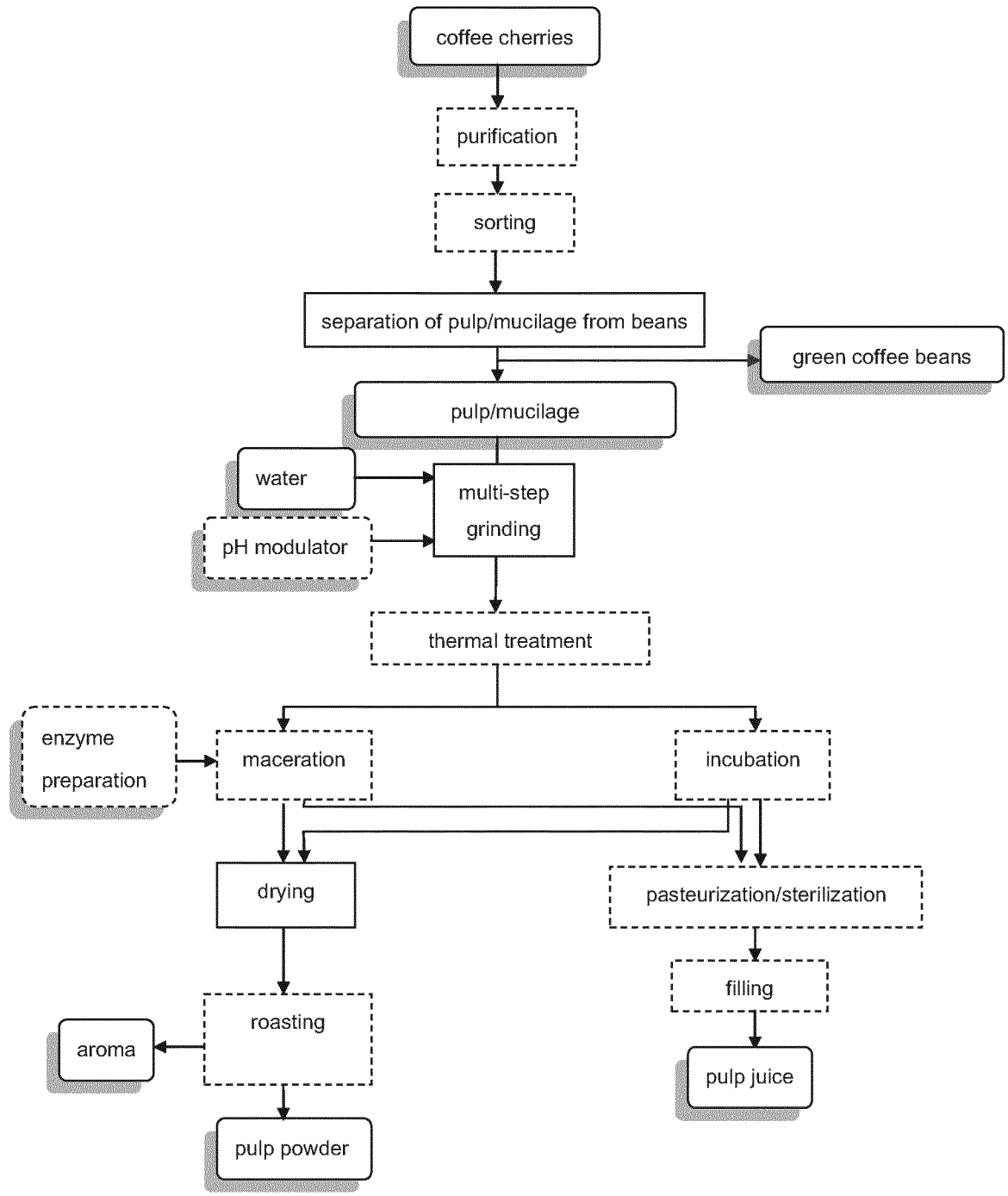
FIG. 2 schematically illustrates an exemplary method of processing coffee pulp for the production of pulp aroma, pulp powder and pulp juice.

One preferred embodiment of the coffee pulp processing method by which coffee pulp aroma, coffee pulp powder and coffee pulp juice may be extracted will be described with reference to FIG. 2. Herein, the finely ground suspension may be subjected to a thermal treatment, which may be optionally followed by maceration or incubation (according to the description related to the first embodiment). The incubated suspension may be pasteurized or sterilized, whereafter it may be filled/packaged or served as coffee pulp juice. On the other hand, macerated suspensions may be dried and optionally roasted according to the description of the second embodiment to provide coffee pulp powder and optionally (roasted) pulp aroma.

Method for Processing of Green Coffee Beans

In a third embodiment, the present invention relates to a coffee cherry processing method, comprising the steps of: (1) separating coffee cherries into pulp and green coffee beans, and adding water to the green, unroasted coffee beans to form a suspension; (2) wet grinding said suspension in multiple grinding steps to an average particle size of 100 μm or less; (3) subjecting said suspension to one or more separation and/or processing steps to obtain at least one coffee cherry extract selected from coffee aroma and roasted coffee powder.

While not being limited thereto, the pre-processing steps and steps (1) and (2) may be carried out according to the description of the third embodiment and in line with FIGS. 4a and 4b. Preferably, the multi-step grinding process is carried out in line with FIG. 4b, wherein the thermal treatment, the pasteurization/sterilization and the maceration, incubation and fermentation steps are optional.

Figure 3:
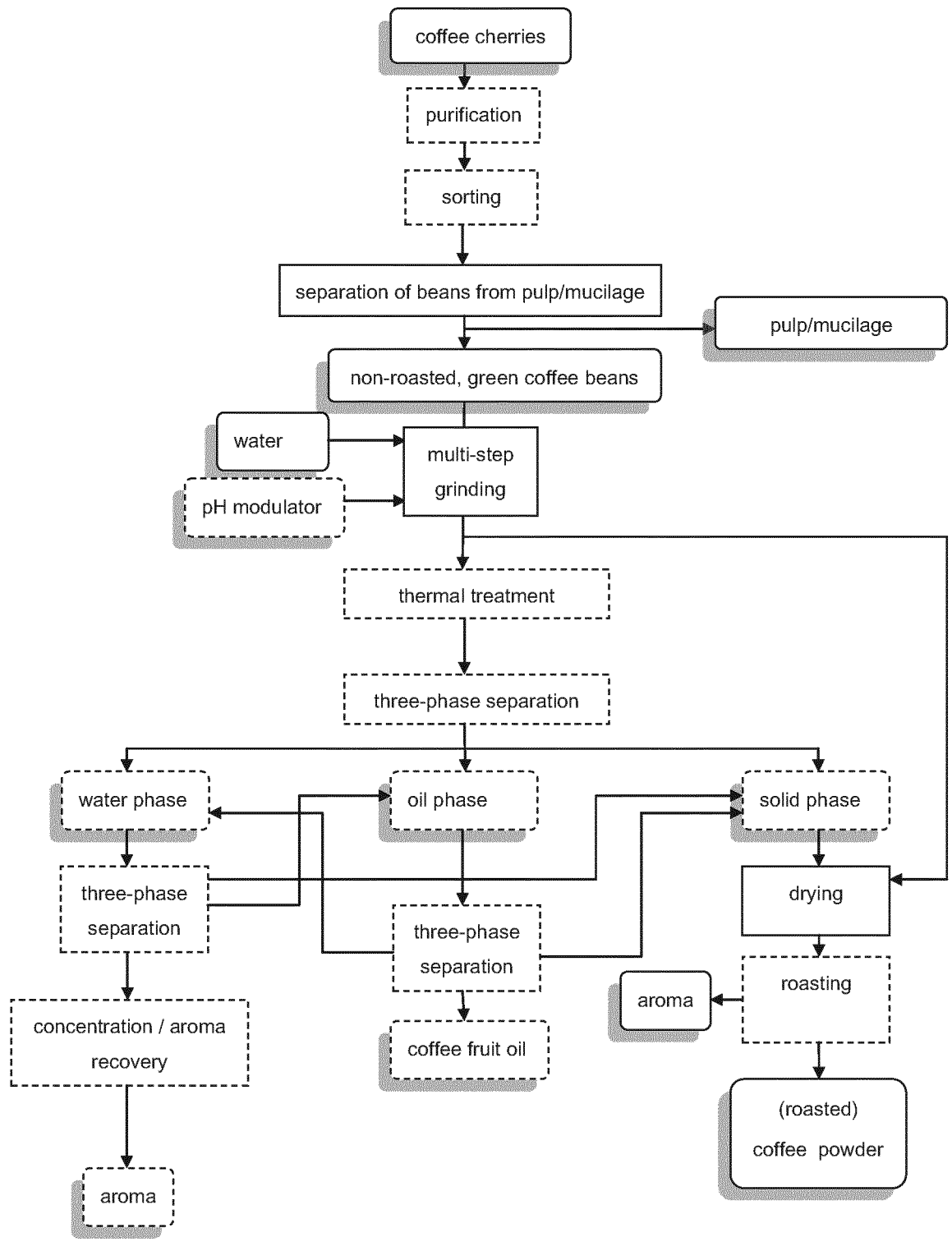
FIG. 3 schematically illustrates exemplary methods of processing green coffee beans in order to extract roasted coffee powder and/or roast aroma.

One preferred embodiment of the green coffee bean processing method will be described with reference to FIG. 3. Herein, the finely ground suspension may be optionally subjected to a thermal treatment according to the description related to the first embodiment. In step (3), the green bean processing method preferably comprises: (a) a step of separating the suspension into a water phase (heavy phase), an oil phase (light phase) and a solid phase; and (b) a step of separately processing the three phases, which optionally comprises at least one of: (b1) separating coffee cherry oil from the oil phase, (b2) drying and optionally roasting the solid phase to extract coffee aroma or to provide green or roasted coffee powder, and (b3) separating coffee cherry aroma or coffee cherry juice from at least the water phase. Preferably, steps (b1) or (b2) comprise an additional step of separating the suspension into a water phase (heavy phase), an oil phase (light phase) and a solid phase. The three-phase separations may be carried out in accordance to the description of the second embodiment.

As an alternative to the optional thermal treatment and the three-phase separation, the finely ground suspension may be directly subjected to drying and optional roasting to obtain (roasted) coffee powder and/or coffee aroma, wherein the drying/roasting is carried out according to the description of the second embodiment.

An especially preferred embodiment from the viewpoint of optimized utilization of coffee cherry components, the method of the present invention is a combination of the third and fourth embodiments described above.

It will be appreciated that the methods of the present invention may employ any of the preferred features specified above with respect to the description of the first to fourth embodiments, and that the preferred features may be combined in any combination, except for combinations where at least some of the features are mutually exclusive.

Further Processing of Coffee Extracts

The coffee extracts obtained by the above-described methods may be directly employed as food products (as food additives, nutritional supplements or beverages, for example). Alternatively, the extracts may be further processed by methods known in the art, including the preparation of dry extracts (by freeze-drying or spray-drying, for example) or isolation of specific bio-actives (e.g. polyphenols, polysaccharides, caffeine).

Once given the above disclosure, many other features, modifications, and improvements will become apparent to the skilled artisan.

The invention claimed is:

1. A coffee cherry processing method, comprising the steps of:
   (1) adding water to coffee cherries or to green, unroasted coffee beans obtained from the coffee cherries to form a suspension;
   (2) wet grinding said suspension in multiple steps to an average particle size of 100 μm or less; and
   (3) subjecting said suspension to one or more separation and processing steps comprising at least the separation of a water phase of the suspension to obtain at least one coffee cherry extract selected from coffee cherry aroma, coffee cherry oil, coffee cherry powder, coffee cherry juice, coffee aroma and green or roasted coffee powder.

2. A coffee cherry processing method, comprising the steps of:
   (1) adding water to coffee cherries to form a suspension:
   (2) wet grinding said suspension in multiple grinding steps to an average particle size of 100 μm or less; and
   (3) subjecting said suspension to one or more separation and optional processing steps comprising at least the separation of a water phase of the suspension to obtain at least one coffee cherry extract selected from coffee cherry aroma, coffee cherry oil, coffee cherry powder, coffee cherry juice, and coffee aroma.

3. The method according to claim 2, wherein step (3) further comprises:
   (a) a step of separating the suspension into the water phase (heavy phase), an oil phase (light phase) and a solid phase, said water phase comprising coffee cherry juice and coffee cherry aroma, said oil phase comprising coffee cherry oil as a major component, and said solid phase comprising green coffee powder and water as major components; and
   (b) a step of separately processing the three phases, which optionally comprises at least one of:
      (b1) separating coffee cherry oil from the oil phase;
      (b2) separating coffee cherry powder and/or aroma from the solid phase; and
      (b3) separating coffee cherry aroma or coffee cherry juice from at least the water phase.

4. A coffee cherry processing method, comprising the steps of:
   (1) separating coffee cherries into pulp and green coffee beans, and adding water to the pulp to form a suspension;
   (2) wet grinding said suspension in multiple grinding steps to an average particle size of 100 μm or less;
   (3) subjecting said suspension to one or more separation and optional processing steps comprising at least the separation of a water phase of the suspension to obtain at least one coffee cherry extract selected from coffee pulp aroma, coffee pulp powder, and coffee pulp juice; and
   (4) neutralizing acidic components in the water phase of the suspension and/or removing acidic components from the water phase.

5. A coffee cherry processing method, comprising the steps of:
   (1) separating coffee cherries into pulp and green coffee beans, and adding water to the green, unroasted coffee beans to form a suspension;
   (2) wet grinding said suspension in multiple grinding steps to an average particle size of 100 μm or less; and
   (3) subjecting said suspension to a separation step followed by one or more processing steps to obtain at least one coffee cherry extract selected from coffee aroma and roasted coffee powder.

6. The method according to claim 5, wherein step (3) comprises:
   (a) a step of separating the suspension into a water phase (heavy phase), an oil phase (light phase) and a solid phase; and
   (b) a step of separately processing the three phases, which optionally comprises at least one of:
      (b1) separating coffee cherry oil from the oil phase;
      (b2) drying and optionally roasting the solid phase to extract coffee aroma or to provide green or roasted coffee powder; and
      (b3) separating coffee cherry aroma or coffee cherry juice from at least the water phase.

7. The method according to claim 3, wherein steps (b1) or (b2) further comprise an additional step of separating the suspension into a water phase (heavy phase), an oil phase (light phase) and a solid phase.

8. The method according to claim 7, wherein the step of separating the suspension into a water phase (heavy phase), an oil phase (light phase) and a solid phase is performed by the use of a decanter.

9. The method according to claim 1, wherein step (2) comprises:
   (a) one or more coarse grinding step(s) to an average particle size of 500 μm or less; and
   (b) a subsequent fine grinding step to an average particle size of 100 μm or less.

10. The method according to claim 1, further comprising a step of subjecting the suspension during or after step (2) to:
    a heat treatment at a temperature of 60° C. or less;
    a pasteurization or a sterilization step;
    a maceration step;
    an incubation step; or
    a fermentation step.

11. The method according to claim 1, wherein a pH modulation step is performed during or after step (1).

12. The method according to claim 1, further comprising a step of neutralizing acidic components in the water phase and/or removing acidic components from the water phase.

13. The method according to claim 1, wherein step (3) comprises a step of continuously drying the suspension or a solid phase of the suspension obtained in step (2); or wherein step (3) comprises a step of continuously drying and subsequently roasting the suspension or the solid phase obtained in step (2).

14. A coffee cherry processing method, comprising the steps of:
    (1) separating coffee cherries into pulp and green, unroasted coffee beans, and adding water to the pulp to form a first suspension, and adding water to the green, unroasted coffee beans to form a second suspension;
    (2) wet grinding said first suspension in multiple grinding steps to an average particle size of 100 μm or less, and wet grinding said second suspension in multiple grinding steps to an average particle size of 100 μm or less; and
    (3) subjecting said first suspension to one or more separation and/or processing steps comprising at least the separation of a water phase of the first suspension to obtain at least one coffee cherry extract selected from coffee pulp aroma, coffee pulp powder, and coffee pulp juice; and subjecting said second suspension to one or more separation and/or processing steps to obtain at least one coffee cherry extract selected from coffee aroma and roasted coffee powder.

* * * * *